(12) United States Patent
Fisher et al.

(10) Patent No.: US 10,013,169 B2
(45) Date of Patent: Jul. 3, 2018

(54) COOPERATIVE DATA DEDUPLICATION IN A SOLID STATE STORAGE ARRAY

(71) Applicant: International Business Machines Corporation, Armonk, NY (US)

(72) Inventors: Timothy J. Fisher, Cypress, TX (US); Nikolas Ioannou, Zurich (CH); Ioannis Koltsidas, Zurich (CH); Roman A. Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 14/576,247

(22) Filed: Dec. 19, 2014

(65) Prior Publication Data

US 2016/0179395 A1 Jun. 23, 2016

(51) Int. Cl.
*G06F 3/06* (2006.01)

(52) U.S. Cl.
CPC .......... *G06F 3/0608* (2013.01); *G06F 3/0641* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 8,788,468 B2 | 7/2014 | Amit et al. | |
| 2010/0281207 A1* | 11/2010 | Miller | G06F 3/0608 711/103 |
| 2011/0015778 A1 | 1/2011 | Edling et al. | |
| 2012/0150826 A1* | 6/2012 | Vijayan Retnamma | G06F 17/30312 707/692 |
| 2013/0198150 A1 | 8/2013 | Kim et al. | |
| 2013/0282965 A1 | 10/2013 | Sengupta et al. | |
| 2014/0032508 A1 | 1/2014 | Rao et al. | |
| 2014/0046997 A1 | 2/2014 | Dain et al. | |
| 2014/0136810 A1 | 5/2014 | Colgrove et al. | |
| 2015/0161000 A1* | 6/2015 | Kim | G06F 11/108 714/6.24 |

OTHER PUBLICATIONS

Feng Chen, Tian Luo, and Xiaodong Zhang. 2011. CAFTL: a content-aware flash translation layer enhancing the lifespan of flash memory based solid state drives. In Proceedings of the 9th USENIX conference on File and stroage technologies (FAST'11). USENIX Association, Berkeley, CA, USA, 6-6.*

(Continued)

*Primary Examiner* — Edward J Dudek, Jr.
*Assistant Examiner* — Ralph A Verderamo, III
(74) *Attorney, Agent, or Firm* — William H. Hartwell

(57) ABSTRACT

Deduplication of data on a set of non-volatile memory by performing the following operations: receiving a first dataset; determining whether the first dataset is already present in data written to a first set of non-volatile memory; and on condition that the first dataset is determined to have already been present in the data written to the first set of non-volatile memory, providing a linking mechanism to associate the received first dataset with the already present data written to the first set of non-volatile memory.

20 Claims, 10 Drawing Sheets

(56) References Cited

OTHER PUBLICATIONS

Black, J., "Compare-by-Hash: A Reasoned Analysis", Apr. 14, 2006, USENIX Association, Annual Tech '06: 2006 USENIX Annual Technical Conference, pp. 85-90.

IBM, "Solid-State-Drive Data-Deduplication Apparatus", An IP.com Prior Art Database Technical Disclosure, Original Publication Date: May 14, 2009, IP.com No. IPCOM000183088D, IP.com Electronic Publication: May 14, 2009, pp. 1-3.

Mattson et al., "Evaluation techniques for storage hierarchies", IBM Syst J, No. 2, 1970, pp. 78-117.

Menon, Jai, "A Performance Comparison of RAID-5 and Log-Structured Arrays", Proceedings of the 4th IEEE International Symposium on High Performance Distributed Computing, 1995, pp. 167-178, © 1995 IEEE.

"Data deduplication", Wikipedia, the free encyclopedia, This page was last modified on Aug. 16, 2014, <http://en.wikipedia.org/wiki/Data_deduplication>.

* cited by examiner

604

| FINGERPRINT | vPBA | DEDUPLICATION COUNT |
|---|---|---|
| 20 BYTES | 8 BYTES | 2 BYTES |

| | | | |
|---|---|---|---|
| $LBA_0$ | $PBA_{347}$ | | |
| $LBA_1$ | $vPBA_0$ | | |
| $LBA_2$ | | | |
| $LBA_3$ | $PBA_{16384}$ | | 626 |
| | ... | | |
| $LBA_{n-2}$ | $vPBA_0$ | | |
| $LBA_{n-1}$ | $vPBA_{1243}$ | | |
| $vPBA_0$ | $PBA_{12}$ | 2 | |
| $vPBA_1$ | | | |
| | ... | ... | 628 |
| $vPBA_{m-2}$ | $PBA_{16}$ | 4 | |
| $vPBA_{m-1}$ | $PBA_{3154}$ | 11 | |

FIG. 4C

| FINGERPRINT | vPBA | DEDUPLICATION COUNT | GLOBAL LBA | vPBA |
|---|---|---|---|---|
| 20 BYTES | 8 BYTES | 2 BYTES | 8 BYTES | 8 BYTES |

604b

910

SEND READ COMMAND TO CORRESPONDING FLASH NODE — 912

LOOK UP THE REQUESTED PBA IN THE FLASH NODE'S LPT — 914

READ THE PBA — 916

RETURN THE READ DATA TO THE INTERFACE NODE — 918

COOPERATIVE DATA DEDUPLICATION IN A SOLID STATE STORAGE ARRAY

BACKGROUND OF THE INVENTION

The present invention relates generally to non-volatile memory, such as NAND flash memory, and more particularly to data deduplication within a non-volatile memory.

Data deduplication is known. Data deduplication is a specialized data compression technique for eliminating duplicate copies of repeating data. Data deduplication typically involves identifying unique chunks of data and storing them during an analysis process. As the process continues, other chunks are compared to the stored copy and whenever a match occurs, the redundant chunk is replaced with a small reference that points to the stored chunk. Data deduplication is commonly used to improve storage utilization.

Non-volatile memory, or memory that retains data without power, is known. NAND-based flash memory is one type of non-volatile memory. The performance characteristics of conventional NAND-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

In flash-based SSDs, memory locations are erased in blocks prior to being written to. The size of an erase block unit is typically 256 pages and an erase operation takes approximately one order of magnitude more time than a page program operation. Due to the intrinsic properties of NAND-based flash, flash-based SSDs write data out-of-place whereby a mapping table maps logical addresses of the written data to physical ones. This mapping table is typically referred to as the Logical-to-Physical Table (LPT). In flash-based SSDs, an invalidated data location cannot be reused until the entire block it belongs to has been erased. Before erasing, the block undergoes garbage collection, whereby any valid data in the block is relocated to a new block. Garbage collection of a block is typically deferred for as long as possible to maximize the amount of invalidated data in the block, and thus reduce the number of valid pages that are relocated, as relocating data causes additional write operations, and thereby increases write amplification.

As flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction codes (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

SUMMARY

According to embodiments of the present invention, there is a method, computer program product and/or system that performs the following operations (not necessarily in the following order): receiving a first dataset; determining whether the first dataset is already present in data written to a first set of non-volatile memory; and on condition that the first dataset is determined to have already been present in the data written to the first set of non-volatile memory, providing a linking mechanism to associate the received first dataset with the already present data written to the first set of non-volatile memory.

BRIEF DESCRIPTION OF THE DRAWINGS

FIG. 4B is a table showing information that is helpful in understanding the second embodiment system;

FIG. 4C is a diagram showing information that is helpful in understanding the second embodiment system;

DETAILED DESCRIPTION

Figure 1:
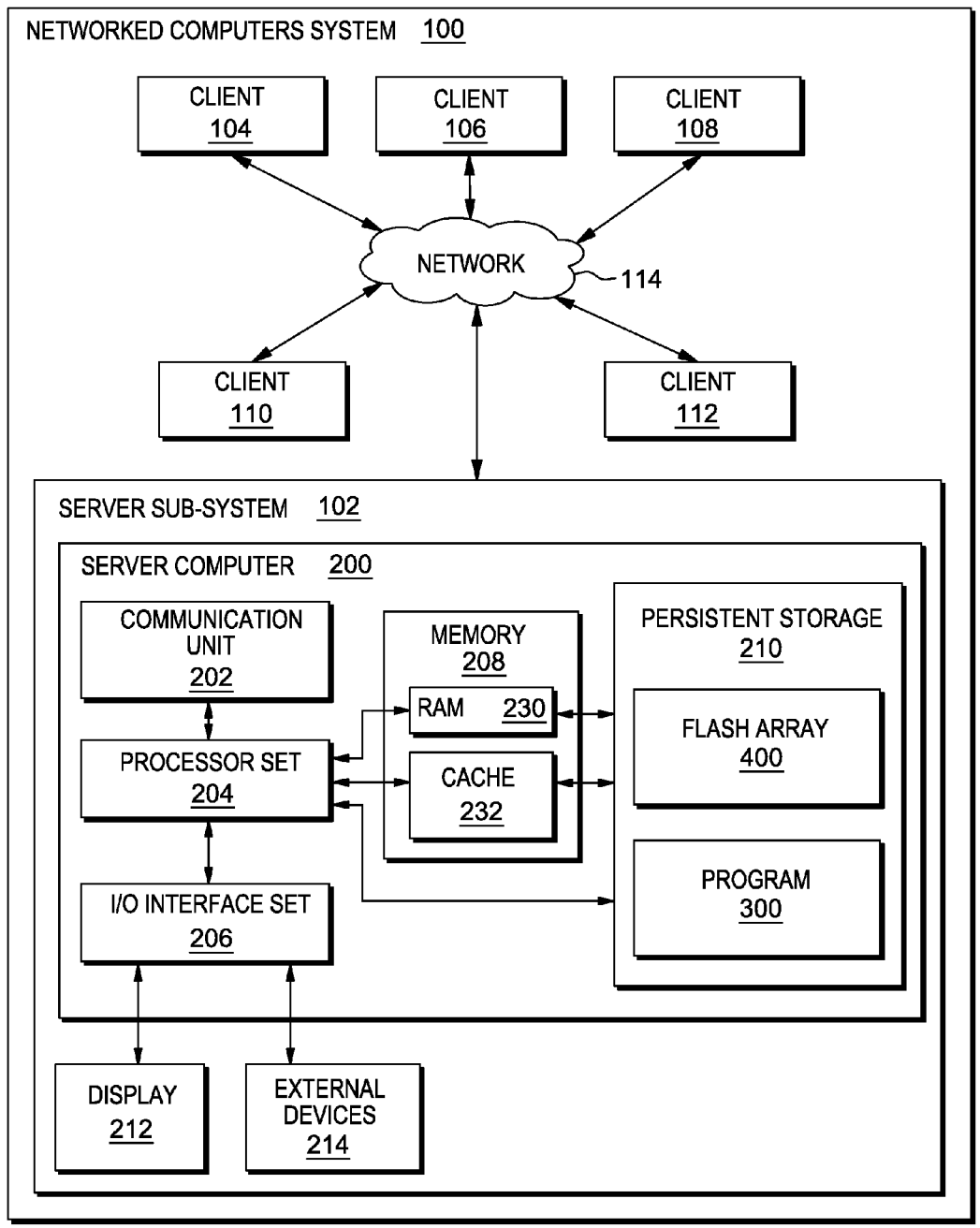
FIG. 1 is a block diagram view of a first embodiment of a system according to the present invention.

Embodiments of the present invention deduplicate data in a solid state storage array by mapping logical addresses of non-duplicate data directly to physical data blocks and mapping logical addresses of duplicate data to virtual data blocks, thereby providing the necessary indirection needed for data deduplication, when necessary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a functional block diagram illustrating various portions of networked computers system 100, including: sub-system 102; client sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; program 300; and flash array 400. While some embodiments are described with respect to flash memory, it should be appreciated that the present invention can be implemented with a wide range of memory mediums, including for example non-volatile random access memory (NVRAM) technologies in addition to NAND flash memory such as NOR flash memory, phase-change memory (PCM or PRAM), magnetoresistive RAM (MRAM) and resistive RAM (RRAM) as well as combinations thereof.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210. Persistent storage 210 further includes flash array 400, which will be discussed in further detail below.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 2:
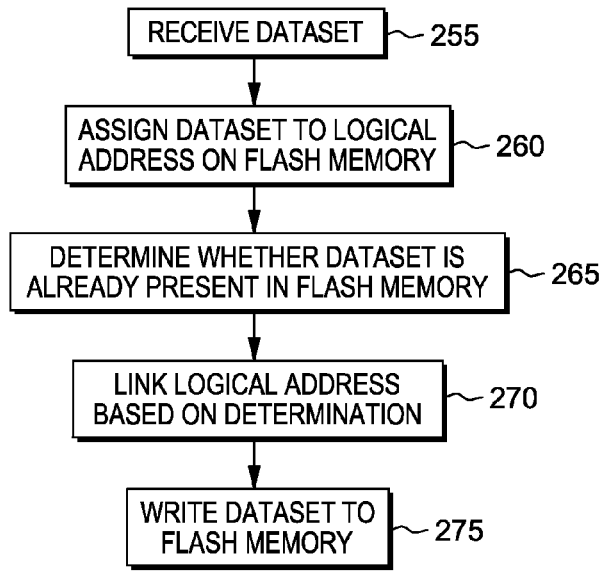
FIG. 2 is a flowchart showing a first embodiment method performed, at least in part, by the first embodiment system.
Figure 3:
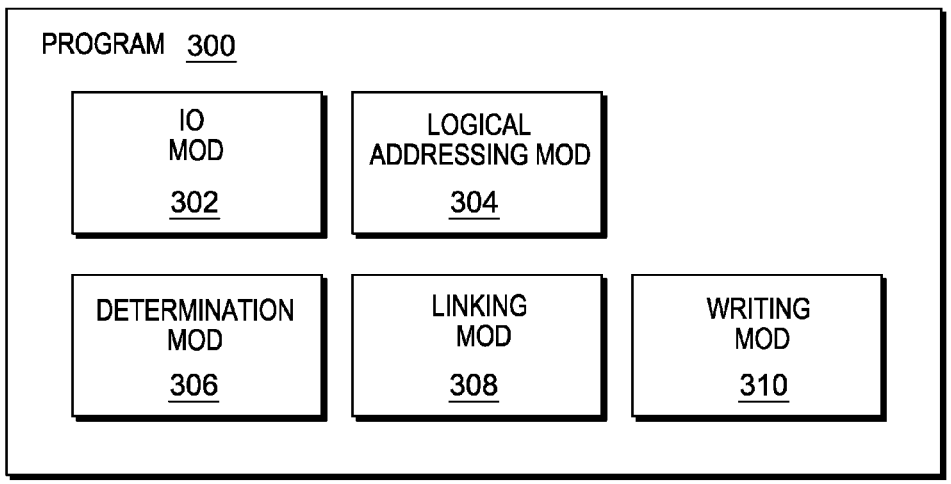
FIG. 3 is a block diagram showing a machine logic (for example, software) portion of the first embodiment system.

FIG. 2 shows flowchart 250 depicting a method according to the present invention. FIG. 3 shows program 300 for performing at least some of the operations of flowchart 250.

This method and associated software will now be discussed, over the course of the following paragraphs, with extensive reference to FIG. 2 (for the operation blocks) and FIG. 3 (for the software blocks).

Generally speaking, the method depicted by flowchart 250 is a method for deduplicating data on flash array 400 (see FIG. 1), where flash array 400 contains a plurality of flash nodes. More specifically, flowchart 250 depicts a method for writing data to flash array 400 such that duplicate (that is, identical) data is not written to multiple locations on flash array 400 at the same time. Rather than writing duplicate data to multiple locations, the method utilizes a linking mechanism to link logical addresses of duplicate data to a single instance of the data located on a physical data block of one of the flash nodes. I/O module ("mod") 302 (see FIG. 3) receives (255) a dataset (see FIG. 2). In the present example embodiment, the dataset includes a single data block. As used herein, a data block (or "block") is simply meant to be a sequence of one or more bits that may be read or written as a group. In some embodiments, for example, a block may be equal to a byte (eight bits) of data. In other embodiments, a block may equal 4096 bytes of data. However, this is not meant to be limiting, and embodiments of the present invention may include data blocks of varying lengths and/or configurations. Furthermore, in some embodiments, I/O mod 302 receives the dataset into an interface node.

Logical addressing mod 304 (see FIG. 3) assigns (260) the dataset to a logical address on a set of flash memory (see FIG. 2). In this example embodiment, the set of flash memory is flash array 400, which includes a plurality of flash nodes. Additional examples of flash arrays and assigning logical addresses are described below.

Some embodiments utilize logical addresses (such as logical block addresses) as a way to organize and/or link data on a flash array (such as flash array 400). However, in other embodiments, logical addresses may not be necessary. For example, in some embodiments, program 300 is able to perform the determination (265), linking (270), and writing (275) operations (discussed below) without the use of logical addresses. In these embodiments, methods for organizing and/or linking data on a flash array may be used.

Determination mod 306 (see FIG. 3) determines (265) whether the dataset is already present in the set of flash memory (see FIG. 2). Or, stated another way, in operation 265, program 300 determines whether the dataset is a duplicate of any data located on the set of flash memory. This determination may be performed in a number of ways and in a number of locations (for example, by utilizing a deduplication cache), many of which are discussed below. In the present example embodiment, determination mod 306 performs a simple search of flash array 400 to determine whether the dataset is a duplicate. As a result, determination mod 306 determines (265) that the dataset is not, in fact, a duplicate, and that the dataset contains data that is not already present on the set of flash memory.

Linking mod 308 (see FIG. 3) links (270) the dataset's assigned logical address based on the determination in operation 265. In many embodiments, the linking occurs via a linking mechanism. Furthermore, in many embodiments, including embodiments discussed below, linking mod 308 utilizes a logical-to physical table (LPT) when performing the linking. If the dataset is determined to be a duplicate, linking mod 308 links the logical address to the associated "original" data (that is, the data that the dataset is a duplicate of). Alternatively, if the dataset is determined not to be a duplicate (that is, if the dataset is not already present in the data written to the set of flash memory), linking mod 308 links the dataset's assigned logical address to a new and/or empty location on the set of flash memory for subsequent writing in operation 275 (see below). In the present example embodiment, where the dataset has been determined to not be a duplicate, linking mod 308 links the dataset's assigned logical address to an empty data block on flash array 400.

In some embodiments, the linking mechanism used to link the logical address to already-existing data includes using virtual data blocks. In these embodiments, the linking mechanism includes mapping the dataset's assigned logical address to a virtual data block on the set of flash memory, where the data block is associated with (for example, mapped to) the already present data. A further discussion of virtual data blocks (also referred to as "virtual physical data blocks") is provided below.

It should be noted that in some embodiments of the present invention (such as those without logical addresses), the linking mechanism simply associates the dataset with the already present data written to the set of flash memory, without the use of logical addresses, virtual data blocks, or the like. However, the foregoing is by way of example not limitation, and embodiments of the present invention may link the dataset to the data written on the flash memory in other ways.

Writing mod 310 (see FIG. 3) writes (275) the dataset to the set of flash memory. Write operation 275 typically occurs when the dataset is not a duplicate (that is, when the dataset is not already present in the data written to the flash memory). As such, in many situations, such as when the dataset is a duplicate, write operation 275 is not needed. However, in situations where write operation 275 takes place, write operation 275 is performed using any known (or yet to be known) method(s) for writing data to a flash memory. In some embodiments write operation 275 is done in a log-structure fashion at the flash node level. In the present example embodiment, where the dataset is not a duplicate, the dataset is written to the identified empty data block on flash array 400.

Embodiments of the present invention further include operations for reading the data written to the flash memory. For example, in many embodiments, data is read by performing a read operation on the respective dataset's assigned logical address. If the dataset was previously determined to be a duplicate, the read operation reads the previously present data that was linked to the logical address via the linking mechanism. If the dataset was not a duplicate, the read operation simply reads the written dataset as linked to the logical address via the linking mechanism. In either situation, the read operation performs in substantially the same way, thereby minimizing the amount of processor actions needed to read the data, regardless of whether the data is duplicate data.

Some embodiments of the present invention include a data deduplication architecture in an all-flash array system that may include one, or more, of the following features, characteristics and/or advantages: (i) adding zero latency to read operations that target non-duplicate data; (ii) adding minimal latency to read operations that target duplicated data; (iii) allowing zero additional latency to write operations in asynchronous configuration, where duplicates are eliminated after the writes complete; (iv) allowing inline deduplication, where duplicate data does not get written to the flash media; (v) deduplicating data across all flash nodes of an all-flash array; (vi) exploiting commonalities in data deduplication and LSA requirements, in order to minimize the amount of additional metadata; (vii) embedding deduplication metadata together with log structured array (LSA)

metadata, achieving correctness with minimal additional persistent space, where only a small amount of metadata is required to be persistent, and the vast majority of metadata can be reconstructed upon failure; and/or (viii) imposing minimal changes to the way the flash nodes do garbage collection (whereby any valid data in the block is relocated to a new block).

In many embodiments of the present invention, a deduplication architecture exists wherein one or more interface nodes interacts with one or more flash nodes. For example purposes, many of the embodiments discussed herein will include only one interface node. It should be understood, however, that embodiments of the present invention may include a plurality of interface nodes sharing the same (or different) metadata.

In many embodiments, an interface node detects duplicate data in fixed-size chunks, and distributes the duplicate data to flash nodes. The duplicates are detected at the same granularity at which a flash controller maps user-visible Logical Block Addresses (LBA) to internal Physical Block Addresses (PBA) (which, in some embodiments, are 4096 bytes).

In some embodiments of the present invention, an LBA with no duplicates maps to a PBA, as it would normally without support for deduplication. However, when an LBA has duplicates, the LBA maps to a virtual PBA (vPBA). The vPBA provides the necessary indirection needed for mapping duplicated data. Because only duplicated data maps to the vPBA, the non-duplicated data has the same access latency as in systems without support for deduplication.

Figure 4A:
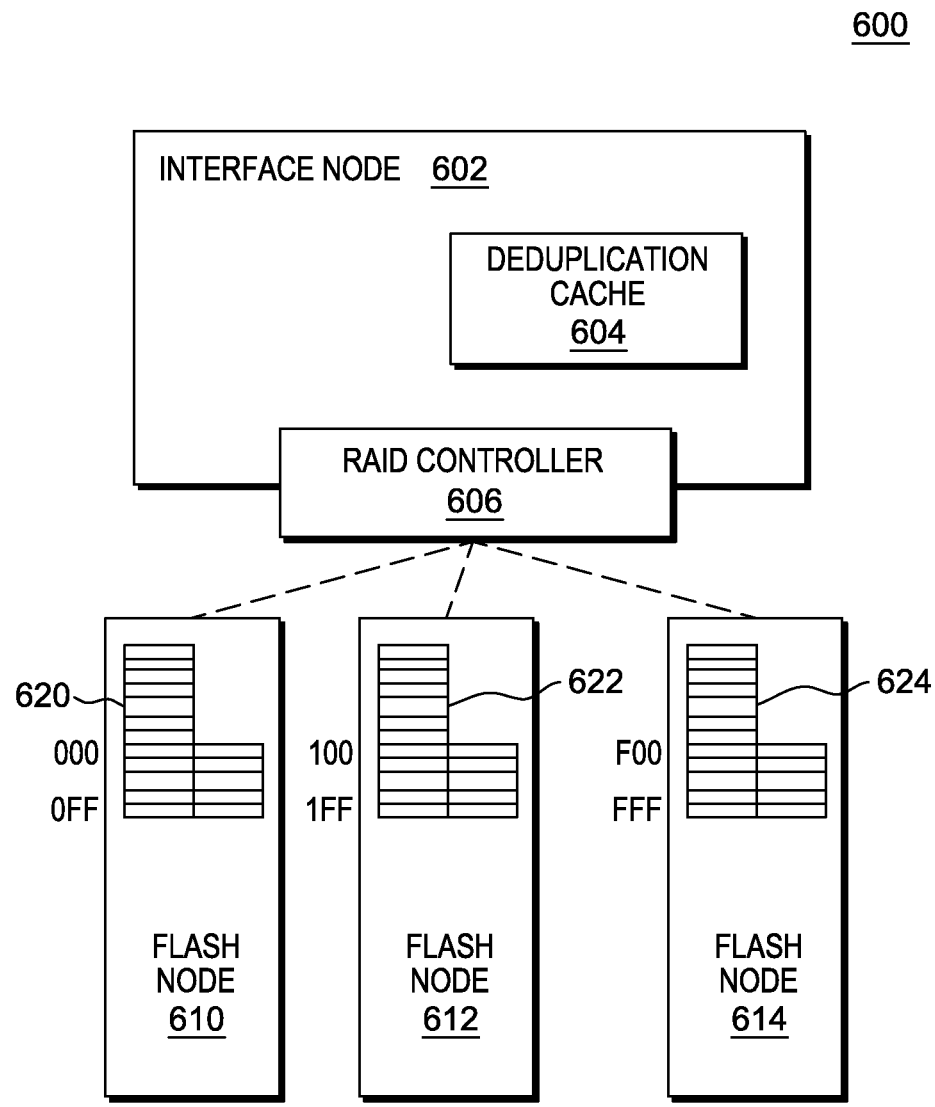
FIG. 4A is a block diagram view of a second embodiment of a system according to the present invention.

One example of a data deduplication design for an all-flash system (also referred to as an "array") 600 is shown in FIG. 4A. As shown in FIG. 4A, array 600 includes interface node 602, RAID controller 606, and flash nodes 610, 612, 614. Furthermore, interface node 602 includes deduplication cache 604, and each flash node 610, 612, 614 includes a logical-to-physical mapping table (LPT) (numbered 620, 622, and 624, respectively). Each LPT 620, 622, 624 includes extended vPBA entries, which are used for identifying deduplicated data.

Interface node 602 (see FIG. 4A) is responsible for the detection of duplicated data and for the balancing of duplicate data amongst flash nodes 610, 612, 614. In one embodiment, data fingerprints are used for data duplication detection, and interface node 602 is responsible for computing each fingerprint and handling the necessary mapping of the fingerprint to a location (LBA or vPBA) in order to detect duplicate data. The calculation of the fingerprint can be performed, for example, in a dedicated hardware assist. Furthermore, some cryptographic hash functions have the necessary properties to guarantee a probability of false positive detection of duplicates that is orders of magnitude lower than the probability of a hardware error. For example, the probability of false positive detection of duplicates for an SHA-1 hash function is roughly $10e^{-29}$, while the probability of a hard error (for example, a DRAM or CPU error) is orders of magnitude higher at greater than $10e^{-15}$. In another embodiment, data duplicate detection is achieved through full data comparison following a fingerprint match.

As mentioned above, in some embodiments of the present invention, interface node 602 includes deduplication cache 604. Deduplication cache 604 includes an entry for each piece of deduplicated data. FIG. 4B includes a table showing the following information that is typically included in deduplication cache 604 for each piece of deduplicated data: (i) the data's fingerprint; (ii) the data's LBA (for unique data) or vPBA (for duplicates); and (iii) a duplicate counter. In the embodiment shown in FIG. 4B, the fingerprint is 20 bytes, the LBA/vPBA data (in this case, vPBA data) is 8 bytes, and the deduplication count is 2 bytes. In this embodiment, deduplication cache 604 occupies 7.5 GiB of data per TiB of deduplicated storage. In another embodiment, however, only 18 byes are used for deduplication cache 604. In this embodiment, deduplication cache 604 occupies 4.5 GiB of data per TiB of deduplicated storage, with a non-cryptographic fingerprint plus mandatory full-data comparison.

In some embodiments, where the capacity of deduplication cache 604 is a limiting factor, deduplication cache 604 may drop entries and thus effectively become a best-effort deduplication cache. Entries may be dropped based on, for example, a least recently used (LRU) algorithm or some other replacement policy. It should be noted that in some embodiments, entries with a deduplication counter equal to zero would be dropped first, which would only reduce the amount of data being tracked for a first duplicate. The same mechanism may be used with or without dropping entries. That is, the described mechanism can be either a best-effort deduplication or a strong-guarantee deduplication.

In many embodiments of the present invention, flash nodes 610, 612, 614 (see FIG. 4A) are responsible for handling the mapping of logical block addresses (LBA) to the physical addresses that contain actual data. In many of these embodiments, each node 610, 612, 614 handles its own local LBAs, where there is a direct mapping from the array-level LBA to the node LBA through the RAID controller 606. In some embodiments, in order to support the data deduplication scheme of the present invention, each flash node's LPT (620, 622, 624) is extended to have a range of globally addressable virtual PBAs (vPBAs) that provide the additional indirection required for deduplicated data. FIG. 4C depicts one of these embodiments. FIG. 4C shows LPT 624, located in flash node 614, and includes LBA portion 626 and vPBA portion 628. LBA portion 626 (which, generally speaking, can refer to the LBA portion of any of the flash nodes 610, 612, 614) includes the LBAs that are available for use (that is, the logical addresses included within the logical capacity of the flash array 600). vPBA portion 628 (which also, generally speaking, can refer to the vPBA portion of any of the flash nodes 610, 612, 614) includes extended LPT entries for deduplicated indirection. As shown in FIG. 4C, LBAs in LBA portion 626 can map to a PBA or to a vPBA. In this embodiment, PBAs mapped to by LPT 624 are located on the same node as LPT 624 (that is, node 614). However, in this embodiment, vPBAs are global. If an LBA maps to a vPBA, then one extra table lookup is needed in order to find the data location upon a read operation. In some embodiments, the LBA to vPBA/PBA lookup is performed on the flash node (610, 612, 614) to which a global LBA is mapping. This mapping from global LBAs to nodes (610, 612, 614) is a static mapping that can be implicitly defined. Because a vPBA is globally addressable, an LBA entry containing a vPBA entry may reference a PBA location that resides in another flash node (610, 612, 614). The read paths for cooperative deduplication will be discussed in further detail below.

It should be noted that in some embodiments of the present invention, commands (such as read operations) can be passed amongst flash nodes (610, 612, 614). In these embodiments, a read operation of deduplicated data can be redirected from a first flash node (such as node 610) that performed an LBA lookup to a second flash node (such as node 612) that holds the vPBA to PBA mapping and the PBA containing the actual data. The second flash node 612 can then directly return the read data directly to interface node 602 as if it would have been read from the first node 610.

Figure 5A:
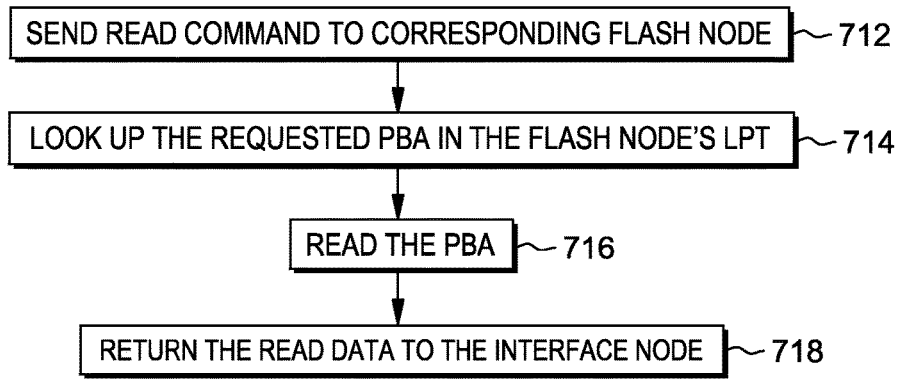
FIG. 5A is a flowchart showing a second embodiment method performed, at least in part, by the second embodiment system.
Figure 5B:
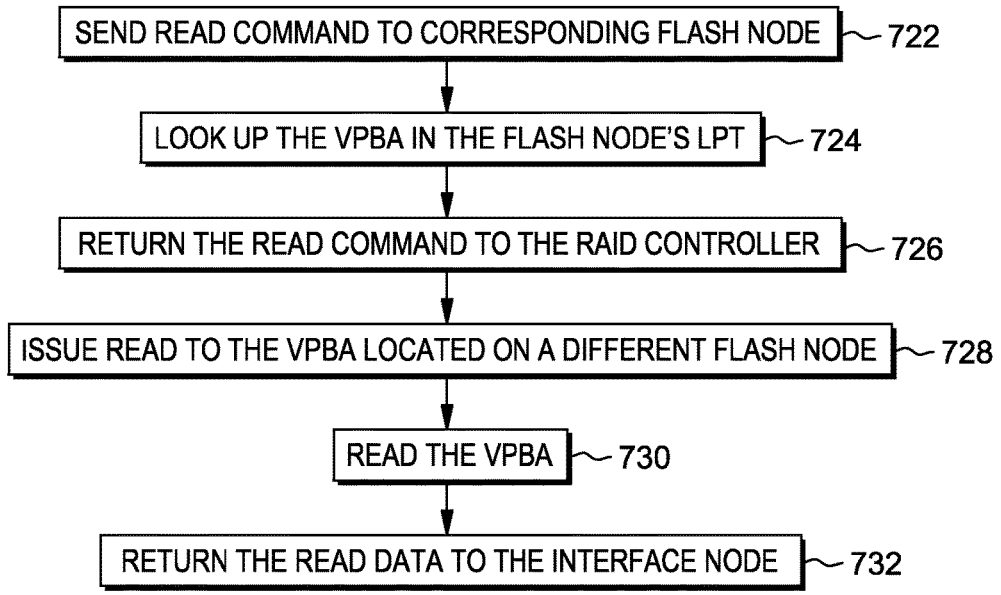
FIG. 5B is a flowchart showing a third embodiment method performed, at least in part, by the second embodiment system.
Figure 5C:
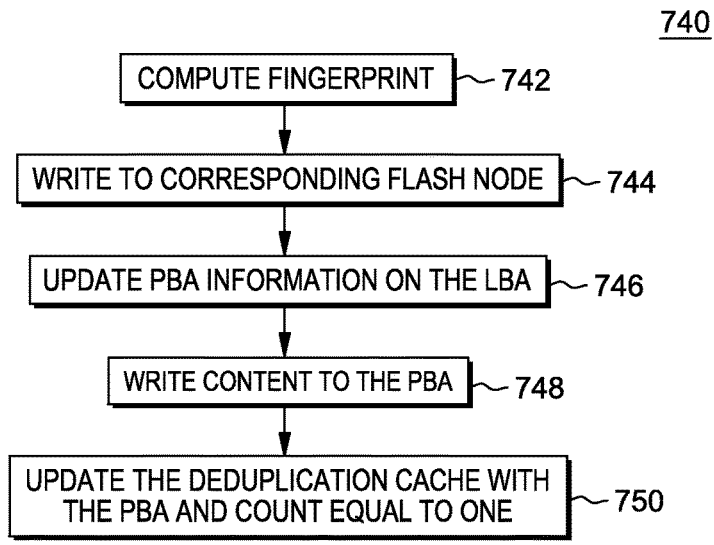
FIG. 5C is a flowchart showing a fourth embodiment method performed, at least in part, by the second embodiment system.
Figure 5D:
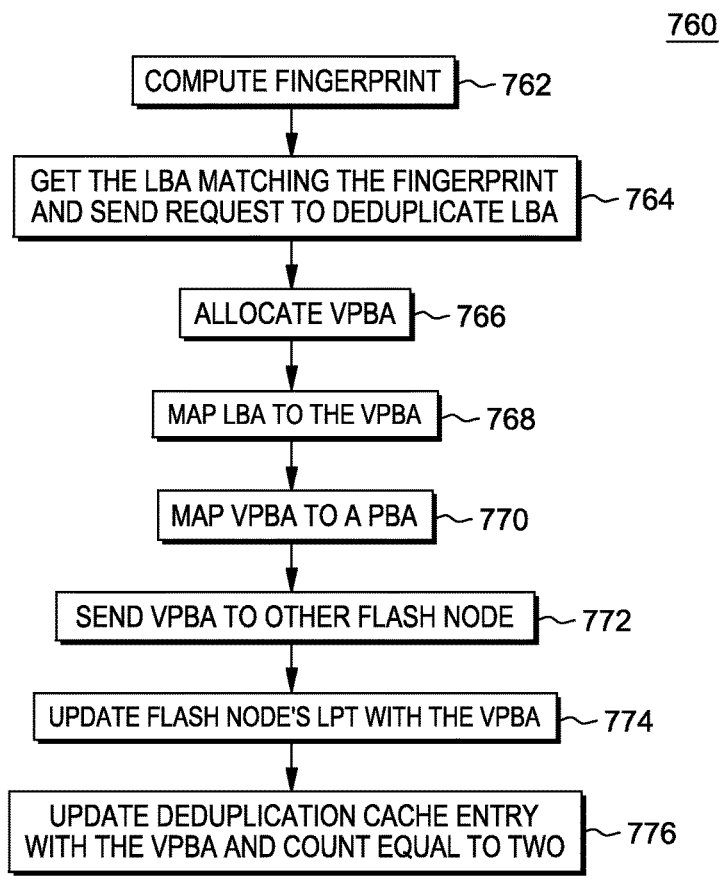
FIG. 5D is a flowchart showing a fifth embodiment method performed, at least in part, by the second embodiment system.
Figure 5E:
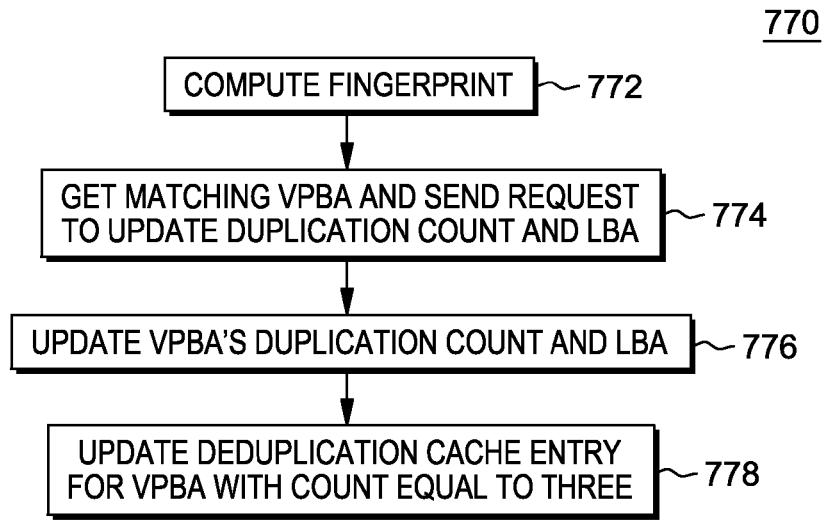
FIG. 5E is a flowchart showing a sixth embodiment method performed, at least in part, by the second embodiment system.
Figure 5F:
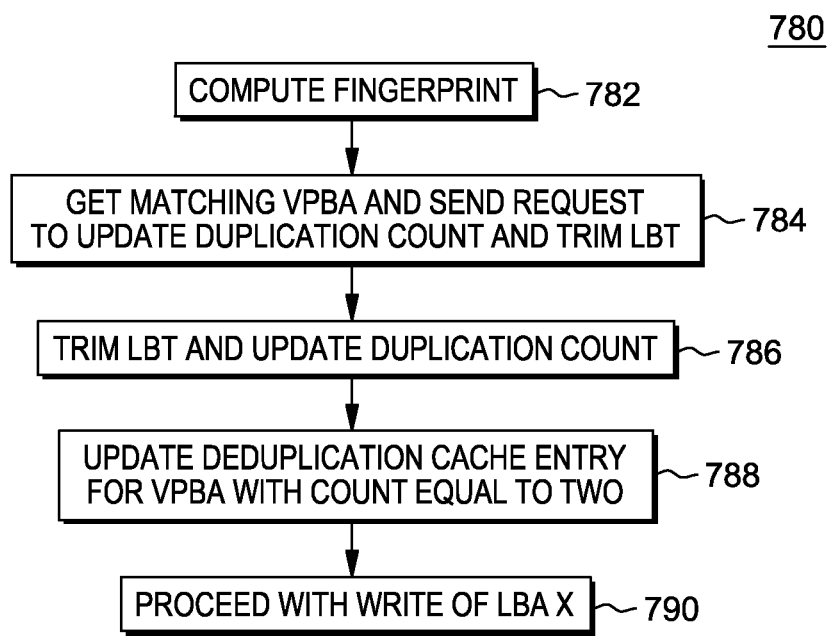
FIG. 5F is a flowchart showing a seventh embodiment method performed, at least in part, by the second embodiment system.

FIGS. 5A and 5B show flowcharts 710 and 720, respectively, depicting methods for performing read operations according to an embodiment of the present invention. These methods will now be discussed in relation to array 600 (shown in FIG. 4A) and cache 604 (shown in FIG. 4B).

Flowchart 710 (see FIG. 5A) depicts a read operation where data is not deduplicated. Processing begins when interface node 602 sends (712) the read command to corresponding flash node 610. RAID controller 606 looks up (714) the requested PBA in the flash node's LPT 620, and reads (716) the PBA. The read data is then returned (718) to interface node 602. Flowchart 720 (see FIG. 5B) depicts a similar read operation, but in this case, the data is deduplicated. Processing begins when interface node 602 sends (722) the read command to corresponding flash node 610. RAID controller 606 looks up (724) the vPBA in the flash node's LPT 620. In the embodiment depicted in FIG. 5B, the vPBA points to data that is located on a different flash node (node 612). Specifically, in this embodiment, the vPBA points to the PBA referenced by address 1AB of vPBA portion 628 of flash node 612. As such, flash node 610 returns (726) the read command to RAID controller 606, and RAID controller 606 issues a read (728) to the vPBA located on the different flash node 612. RAID controller 606 reads (730) the data referenced by the vPBA and returns (732) it to interface node 602.

In many embodiments, during a write operation, an LBA back-pointer is embedded in the data at a PBA location in order to: (a) avoid an expensive LPT search (after garbage collection, for example), and (b) be able to reconstruct the LPT in case of a failure (this requires a unique timestamp as well as the back-pointer). When a duplicate write is performed, the vPBA is embedded in the data at the PBA location instead.

In many embodiments, garbage collection on a flash node requires minimum changes due to the introduction of vPBAs. When garbage collecting a PBA, array 600 (see FIG. 4A) will either map the PBA to an LBA or to a vPBA and the garbage collector will treat the LBA and vPBA in the same way. The PBA will be relocated to a new PBA, and the LBA or vPBA table entry will be updated to map to the relocated PBA.

FIGS. 5C, 5D, 5E, and 5F show flowcharts 740, 760, 770, and 780, respectively, depicting methods for performing write operations according to an embodiment of the present invention. These methods will now be discussed in relation to array 600 (shown in FIG. 4A) and cache 602 (shown in FIG. 4B).

Flowchart 740 (see FIG. 5C) depicts a write operation where LBA X is to be written with unique (that is, non-duplicated) content. Processing begins when interface node 602 computes (742) LBA X's fingerprint, where X is unique or does not fit in cache 604. Interface node 602 then writes (744) X to corresponding flash node 610 using the LBA. Interface node 602 (via, for example, a vPBA management unit) updates (746) the PBA information on the LBA and writes (748) the unique content to the PBA. Interface node 602 updates (750) the corresponding deduplication cache 604 entry with the PBA and a count equal to 1.

Flowchart 760 (see FIG. 5D) depicts a write operation where LBA X is to be written with duplicate data, where the data is a first duplicate. Processing begins when interface node 602 computes (762) LBA X's fingerprint. Interface node 602 then gets (764) LBA Y matching the fingerprint and sends a request to deduplicate LBA Y to LBA Y's flash node 610 (where LBA Y is the location of the original copy of the data). Then, interface node 602 allocates (766) a vPBA for the new write operation, maps (768) the LBA to the vPBA, and maps (770) the vPBA to the PBA. That is, to deduplicate the data, interface node 602 creates the new vPBA pointing to the PBA where the original data is located, and then points LBA Y to the new vPBA. Then, Interface node 602 sends (772) the vPBA to LBA X's flash node 612, updates (774) the flash node's LPT 622 with the vPBA, and updates (776) the deduplication cache 604 entry with the vPBA and a count equal to 2.

Flowchart 770 (see FIG. 5E) depicts a write operation where LBA X is to be written with duplicate data, where there is already more than one deduplicated reference to the data (that is, the data is at least the second duplicate). In the present embodiment, the data to be written to LBA X is, in fact, the second duplicate. Processing begins when interface node 602 computes (772) X's fingerprint. Interface node 602 then gets (774) the respective vPBA from deduplication cache 604 and sends the following to RAID controller 606: (a) an update to the vPBA's duplication count on the vPBA's flash node (for example, flash node 610); and (b) an update to LBA X's flash node (for example, flash node 614). Stated another way, in this operation (774), interface node 602 sends a command to update both the LBA and the count for the corresponding vPBA, which may or may not be located on the same flash node as the LBA. Then, RAID controller 606 correspondingly updates (776) the vPBA's duplication count and the LBA. Interface node 602 then updates (778) the deduplication cache 604 entry for the vPBA with a count equal to 3.

Flowchart 780 (see FIG. 5F) depicts an overwrite operation where LBA X is overwritten with updated content. In this embodiment, LBA X begins with a reference to a vPBA (which has a current duplicate count of 3). However, the overwrite will change the data in LBA X to something other than the data referenced by the vPBA. Processing begins when interface node 602 computes (782) X's fingerprint. Interface node 602 then gets (784) the respective vPBA from deduplication cache 604 and sends the following to RAID controller 606: (a) an update to the duplication count to the vPBA's flash node (for example, flash node 610); and (b) a trim command to the LBA's flash node (for example, flash node 612). Then, RAID controller 606 trims (786) flash node 612's LPT 622, and updates flash node 610's duplication count to 2. Interface node 602 updates (788) the deduplication cache 604 entry for the vPBA with a count equal to 2, and proceeds (790) with a write of LBA X.

Figures 6, 7A:
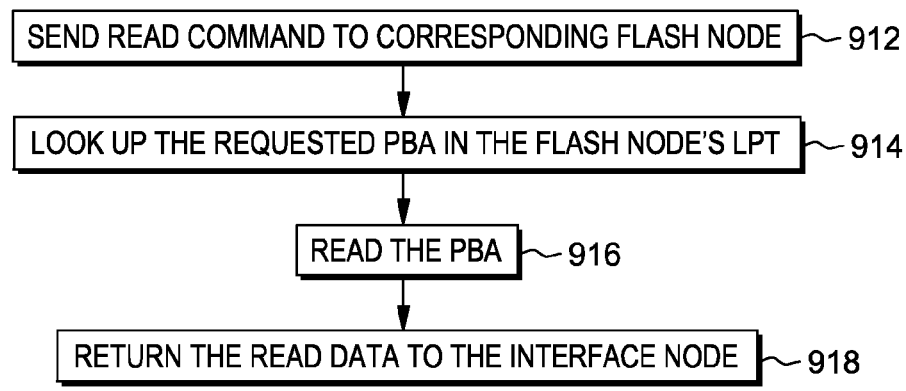
FIG. 6 is a table showing information that is helpful in understanding a third embodiment of a system according to the present invention.
FIG. 7A is a flowchart showing an eighth embodiment method performed, at least in part, by the third embodiment system.
Figure 7B:
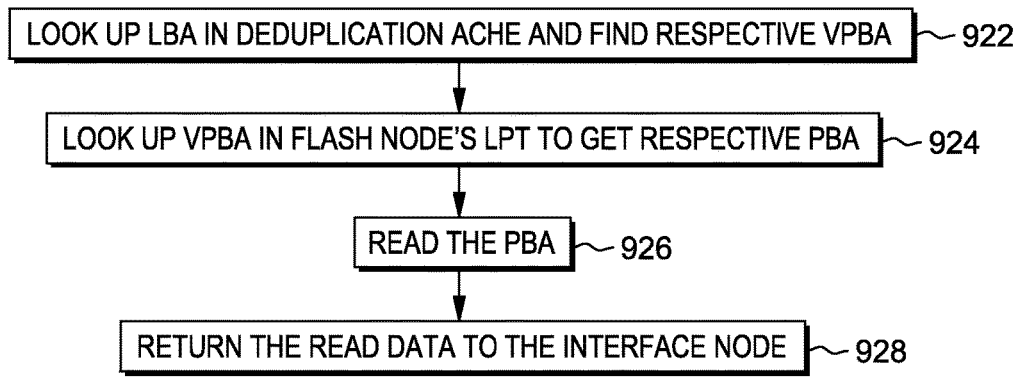
FIG. 7B is a flowchart showing a ninth embodiment method performed, at least in part, by the third embodiment system.
Figure 7C:
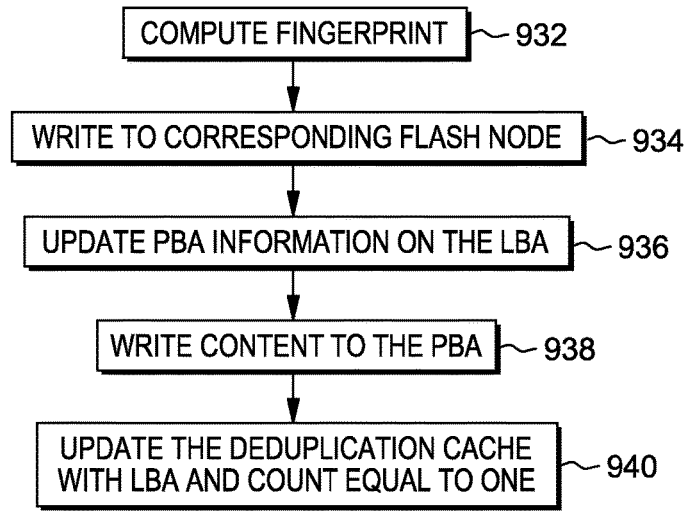
FIG. 7C is a flowchart showing a tenth embodiment method performed, at least in part, by the third embodiment system.
Figure 7D:
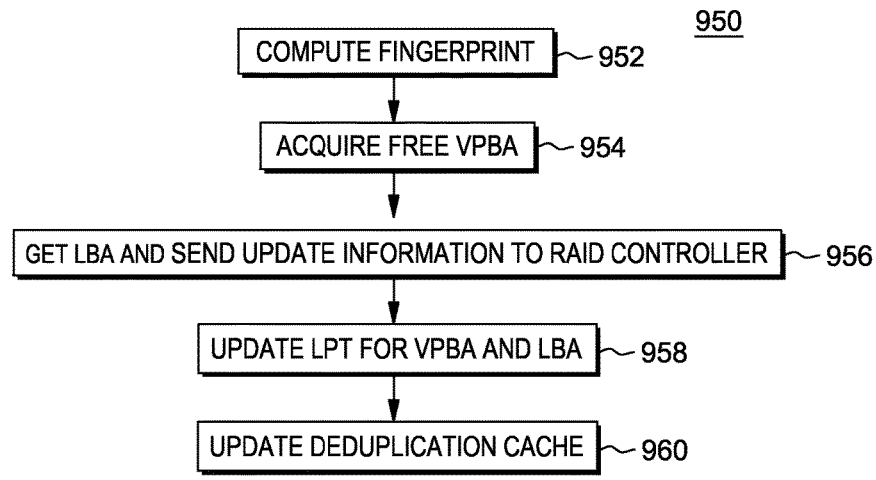
FIG. 7D is a flowchart showing an eleventh embodiment method performed, at least in part, by the third embodiment system.
Figure 7E:
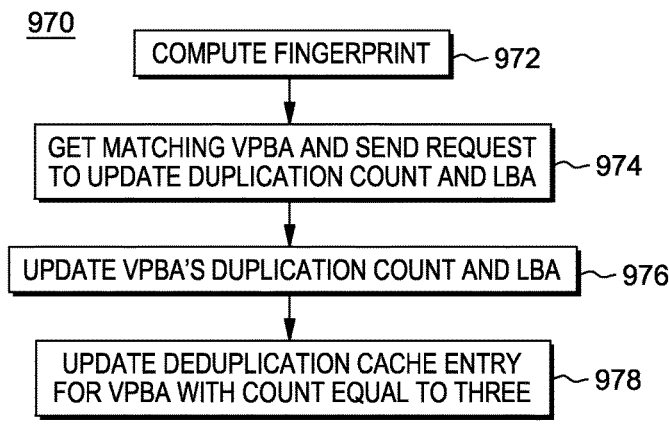
FIG. 7E is a flowchart showing a twelfth embodiment method performed, at least in part, by the third embodiment system.
Figure 7F:
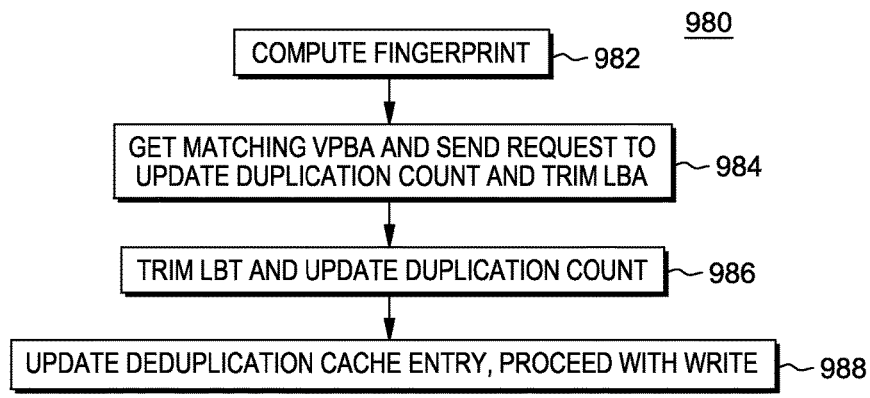
FIG. 7F is a flowchart showing a thirteenth embodiment method performed, at least in part, by the third embodiment system.

In some embodiments of the present invention, deduplicated entries are addressed directly from interface node 602, thereby avoiding an additional flash node-level lookup. A table showing information contained in deduplication cache 604b according to one of these embodiment is depicted in FIG. 6. As shown in FIG. 6, deduplication cache 604b is extended to include: (i) an LBA; and (ii) a pointer to the corresponding vPBA. This allows for fewer changes to existing flash nodes, as the mapping from LBA to vPBA for deduplicated data occurs at the interface node and not at the flash nodes. In the embodiment shown in FIG. 6, deduplication cache 604b includes 46 bytes per entry (30 being the same as cache 604 in FIG. 4B, and 8 each for the new global LBA and the vPBA). In this embodiment, cache 604b occupies 11.5 GiB of data per TiB of deduplicated storage. In another embodiment, only 34 bytes are used for deduplication cache 604b. In this embodiment, cache 604b occupies 8 GiB of data per TiB of deduplicated storage. In many embodiments, deduplication cache 604b is shared between all interface nodes (if there are more than one).

Still referring to the embodiment shown in FIG. 6, an LBA can map either to a PBA or to a vPBA. However, if an LBA is deduplicated, there will be a cache entry in cache 604b for that LBA, where the cache entry will also hold the vPBA. No extra table lookup on the flash node is needed to find the data location. As such, the LBA to vPBA lookup is performed at the interface node 602 instead of the flash node (610, 612, 614). It should be noted that the LPT (620, 622, 624) entry in the flash node (610, 612, 614) for a particular deduplicated LBA also holds the vPBA address. Therefore, deduplication cache 604b need not be persistent. For single-copy data (not deduplicated), read operations are handled the same way as without data deduplication support (that is, on the flash nodes) except for the failed lookup in the deduplication LBA to vPBA cache table.

FIGS. 7A, 7B, 7C, 7D, 7E, and 7F show flowcharts 910, 920, 930, 950, 970, and 980, respectively, depicting methods for performing operations according to the embodiment shown in FIG. 6. These methods will now be discussed in relation to array 600 (shown in FIG. 4A) and deduplication cache 604b (see FIG. 6).

Flowchart 910 (see FIG. 7A) depicts a read operation where data is not deduplicated. Processing begins when interface node 602 sends (912) the read command to corresponding flash node 610. RAID controller 606 looks up (914) the requested PBA in the flash node's LPT 620, and reads (916) the PBA. The read data is then returned (918) to interface node 602. Flowchart 920 (see FIG. 7B) depicts a similar read operation, but in this case, the data is deduplicated. Processing begins when interface node 602 looks up (922) the LBA (called LBA X) in deduplication cache 604b and finds the respective vPBA, if the data is deduplicated. Otherwise, data is read using the LBA. Then, RAID controller 606 looks up (924) the vPBA in the corresponding flash node's LPT 620 to get the respective PBA. RAID controller 606 reads (926) the PBA and returns (928) the read data to interface node 602.

Flowchart 930 (see FIG. 7C) depicts a write operation where LBA X is to be written with unique (that is, non-duplicated) content. Processing begins when interface node 602 computes (932) LBA X's fingerprint, where X is unique or does not fit in cache 604a. Interface node 602 then writes (934) X to the corresponding flash node 610 using the LBA. Interface node 602 updates (936) the PBA information in the LBA, and then writes (938) the unique content to the PBA. Interface node 602 then updates (940) the deduplication cache 604a entry with LBA X and a count equal to 1.

Flowchart 950 (see FIG. 7D) depicts a write operation where LBA X is to be written with duplicate data, where the data is a first duplicate. Processing begins when interface node 602 computes (952) LBA X's fingerprint. Interface node 602 then acquires (954) a free (that is, an available) vPBA. Interface node 602 then gets (956) the LBA matching the fingerprint and sends the following to RAID controller 606: (a) an update to the deduplication count and backwards pointers to the vPBA's flash node (for example, flash node 610), without the data if vPBA flash node is the same as the LBA node and with the data otherwise; (b) an update to the LBA's flash node (for example, flash node 612); and (c) an update to the PBA's flash node (for example, flash node 612) if the vPBA node is not the PBA node. Interface node 602 updates (958) the vPBA's flash node's LPT 620 (with the LBA to vPBA mapping and the vPBA to PBA and count) and further updates the LBA's flash node's LPT 622 with the global vPBA. Interface node 602 updates (960) the deduplication cache 604b cache entry with the vPBA, a count equal to 2, and the corresponding LBA to vPBA mappings.

Flowchart 970 (see FIG. 7E) depicts a write operation where LBA X is to be written with duplicate data, where there is already more than one deduplicated reference to the data (that is, the data is at least the second duplicate). In the present example, the data to be written to LBA X is, in fact, the second duplicate. Processing begins when interface node 602 computes (972) X's fingerprint. Interface node 602 then gets (974) the respective vPBA from deduplication cache 604b and sends the following to RAID controller 606: (a) an update to the vBPA's duplication count on the vPBA's flash node (for example, flash node 610); and (b) an update to LBA X's flash node (for example, flash node 614). Stated another way, in this operation (974), interface node 602 sends a command to update both LBA X and the count for the corresponding vPBA, which may or may not be located on the same flash node as LBA X. Then, RAID controller 606 correspondingly updates (976) node 610's duplication count and node 612's LPT 622 (with the vPBA). Then, interface node 602 updates (978) its deduplication cache 604b entry for the vPBA with a count equal to 3 and the corresponding LBA to vPBA entry.

Flowchart 980 (see FIG. 7F) depicts an overwrite operation where LBA X is overwritten with updated content. In this embodiment, LBA X begins with a reference to a vPBA (which has a current duplicate count of 3). However, the overwrite will change the data in LBA X to something other than the data referenced by the vPBA. Processing begins when interface node 602 computes (982) X's fingerprint. Interface node 602 then gets (984) the respective vPBA from deduplication cache 604b and sends the following to RAID controller 606: (a) an update to the vPBA's duplication count on the vPBA's flash node (for example, flash node 610); and (b) a trim command to the LBA's flash node (for example, flash node 612). Then, RAID controller 606 trims (986) flash node 612's LPT 622, and updates flash node 610's duplication count. Interface node 602 updates (988) its deduplication cache 604 entry for the vPBA with a count equal to 2, and proceeds with a write of LBA X.

In yet another embodiment of the present invention, interface nodes keep track of all unique data in the array through persistent metadata stored in a high-capacity, high-performance storage class memory device. In this embodiment, having persistent metadata allows for a number of optimizations and reductions in indirections. For example, in this embodiment, it is not necessary to go from an interface node to a flash node in order to resolve a vPBA, but it is possible to directly access data on a flash node from the interface node. Persistent metadata also eliminates the necessity of reconstructing metadata (fingerprints) in case of a failure.

In one embodiment, data deduplication is implemented inline (that is, data is deduplicated in the write data path). This embodiment entails adding latency to the write operations of unique data to detect duplicates before proceeding with the actual write. When there is duplicate data, inline deduplication saves write bandwidth and the total number of writes to the physical flash media, due to not performing the write to flash but simply updating deduplication metadata.

In still another embodiment, data deduplication is implemented asynchronously with respect to the write path. In this embodiment, the interface node receives the write request and immediately sends the write to the flash node that it statically maps to (as is done without data deduplication support). In the meantime, the interface node calculates the fingerprint and searches for duplicates. If the written data is found to be a duplicate, the interface node issues an additional trim operation to remove one of the duplicates and recover the capacity. While this embodiment does not reduce write bandwidth, or the number of writes that the flash media sees, it has the advantage of not affecting write latency.

Some embodiments of the invention perform periodic deduplication operations in order to deduplicate data that is already written to flash array 600. These operations are adapted to traverse (or sweep) array 600 to identify existing duplicates and, once identified, deduplicate the identified duplicates via write/rewrite operations. In one embodiment, for example, deduplication operations are performed on a weekly basis. In another embodiment, deduplication operations are performed as background functions in real-time, thereby maximizing the potential usable storage space on flash array 600 in real-time.

DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method comprising:
receiving a first dataset;
assigning the first dataset to a logical address in a mapping table on a first node of a first set of non-volatile memory;
determining by a processor that the first dataset is already present in data written to the first set of non-volatile memory and, in response, identifying that the already present data is written to a first physical data block on a second node of the first set of non-volatile memory; and
providing a linking mechanism to associate the received first dataset with the already present data written to the first set of non-volatile memory, wherein the linking mechanism maps the first dataset's assigned logical address to a first virtual data block in a mapping table on a third node, and wherein the linking mechanism, in response to the already present data not being on the same node as the mapping table on the third node: (i) sends the already present data to the third node to be stored on a second physical data block on the third node, and (ii) maps the first virtual data block in the mapping table on the third node to the second physical data block on the third node.

2. The computer implemented method of claim 1, further comprising:
receiving a second dataset;
assigning the second dataset to a logical address in the mapping table on the first node of the first set of non-volatile memory;
determining by a processor that the second dataset is not already present in data written to the first set of non-volatile memory; and
in response to determining that the second dataset is not already present in the data written to the first set of non-volatile memory, writing the second dataset to the first set of non-volatile memory.

3. The computer implemented method of claim 2, further comprising:
in response to determining that the second dataset is not already present in the data written to the first set of non-volatile memory, mapping the second dataset's assigned logical address to a third physical data block on the first set of non-volatile memory and correspondingly writing the second dataset to the third physical data block.

4. The computer implemented method of claim 3, further comprising:
reading the data written to the third physical data block by performing a read operation on the second dataset's assigned logical address.

5. The computer implemented method of claim 3, wherein:
the first set of non-volatile memory includes a plurality of flash nodes;
the first node, the second node, and the third node are flash nodes; and
the third physical data block is located on the first node.

6. The computer implemented method of claim 1, further comprising:
reading the already present data written to the first set of non-volatile memory by performing a read operation on the first dataset's assigned logical address.

7. The computer implemented method of claim 1, wherein:
the first set of non-volatile memory includes a plurality of flash nodes; and
the first node, the second node, and the third node are flash nodes.

8. The computer implemented method of claim 1, wherein:
at least the receiving operation is performed by a RAID controller.

9. The method of claim 1, further comprising:
in response to receiving an identification of a third physical data block on the third node, wherein the third physical data block is a new location for the already present data due to garbage collection operations performed on the third node, remapping the first virtual data block in the mapping table on the third node to map to the third physical data block on the third node.

10. The method of claim 1, further comprising:
embedding a back-pointer in the already present data, wherein the back-pointer maps to the first virtual data block.

11. The method of claim 10, wherein the back-pointer is utilized in the identification of the third physical data block on the third node after garbage collection operations are performed.

12. The method of claim 10, further comprising:
in the event of a failure, utilizing the back-pointer to reconstruct the mapping table on the third node.

13. A computer program product comprising a computer readable storage medium having program instructions embodied therewith, wherein the computer readable storage medium is not a transitory signal per se, the program instructions readable and/or executable by a processor(s) set to cause the processor(s) set to perform a method comprising:
receiving a first dataset;
assigning the first dataset to a logical address in a mapping table on a first node of a first set of non-volatile memory;
determining, by the processor(s), that the first dataset is already present in data written to the first set of non-volatile memory and, in response, identifying that the already present data is written to a first physical data block on a second node of the first set of non-volatile memory; and
providing a linking mechanism to associate the received first dataset with the already present data written to the first set of non-volatile memory, wherein the linking mechanism maps the first dataset's assigned logical address to a first virtual data block in a mapping table on a third node, and wherein the linking mechanism, in response to the already present data not being on the same node as the mapping table on the third node: (i) sends the already present data to the third node to be stored on a second physical data block on the third node, and (ii) maps the first virtual data block in the mapping table on the third node to the second physical data block on the third node.

14. The computer program product of claim 13, wherein the method further comprises:
receiving a second dataset;
assigning the second dataset to a logical address in the mapping table on the first node of the first set of non-volatile memory;
determining, by the processor(s), that the second dataset is not already present in data written to the first set of non-volatile memory; and
in response to determining that the second dataset is not already present in the data written to the first set of non-volatile memory, writing the second dataset to the first set of non-volatile memory.

15. The computer program product of claim 14, wherein the method further comprises:
in response to determining that the second dataset is not already present in the data written to the first set of non-volatile memory, mapping the second dataset's assigned logical address to a third physical data block on the first set of non-volatile memory and correspondingly writing the second dataset to the third physical data block.

16. The computer program product of claim 13, wherein the method further comprises:
in response to receiving an identification of a third physical data block on the third node, wherein the third physical data block is a new location for the already present data due to garbage collection operations performed on the third node, remapping the first virtual data block in the mapping table on the third node to map to the third physical data block on the third node.

17. A computer system comprising:
a processor; and
a computer readable storage medium;
wherein the processor is configured to execute program instructions stored on the computer readable storage medium, the computer readable storage medium comprising:
program instructions executable by the processor to receive a first dataset;
program instructions executable by the processor to assign the first dataset to a logical address in a mapping table on a first node of a first set of non-volatile memory;
program instructions executable by the processor to determine that the first dataset is already present in data written to the first set of non-volatile memory and, in response, identifying that the already present data is written to a first physical data block on a second node of the first set of non-volatile memory; and
program instructions executable by the processor to, provide a linking mechanism to associate the received first dataset with the already present data written to the first set of non-volatile memory, wherein the linking mechanism maps the first dataset's assigned logical address to a first virtual data block in a mapping table on a third node, and wherein the linking mechanism, in response to the already present data not being on the same node as the mapping table on the third node: (i) sends the already present data to the third node to be stored on a second physical data block on the third node, and (ii) maps the first virtual data block in the mapping table on the third node to the second physical data block on the third node.

18. The computer system of claim 17, further comprising:
program instructions executable by the processor to receive a second dataset;
program instructions executable by the processor to assign the second dataset to a logical address in the mapping table on the first node of the first set of non-volatile memory;
program instructions executable by the processor to determine that the second dataset is not already present in data written to the first set of non-volatile memory; and
program instructions executable by the processor to, in response to determining that the second dataset is not already present in the data written to the first set of non-volatile memory, write the second dataset to the first set of non-volatile memory.

19. The computer system of claim 18, further comprising:
program instructions executable by the processor to, in response to determining that the second dataset is not already present in the data written to the first set of non-volatile memory, map the second dataset's assigned logical address to a third physical data block on the first set of non-volatile memory and correspondingly write the second dataset to the third physical data block.

20. The computer system of claim 17, further comprising:
program instructions executable by the processor to, in response to receiving an identification of a third physical data block on the third node, wherein the third physical data block is a new location for the already present data due to garbage collection operations performed on the third node, remap the first virtual data block in the mapping table on the third node to map to the third physical data block on the third node.

* * * * *